Patented Jan. 31, 1939

2,145,412

UNITED STATES PATENT OFFICE 2,145,412

PHENOL-ALDEHYDE RUBBER HYDROCHLORIDE COMPOSITIONS

Herbert A. Winkelmann, Chicago, Ill., assignor to Marbon Corporation, Chicago, Ill., a corporation of Delaware No Drawing. Application December 30, 1936, Serial No. 118,325

6 Claims. (Cl. 106—23)

This invention relates to improved resin compositions especially adapted for the production of tough, resilient, relatively non-thermoplastic products. More particularly this invention relates to compositions of rubber hydrohalides and phenol-aldehyde resins.

Phenol-formaldehyde resins in their fusible and infusible form possess neither toughness nor elasticity and are notably brittle. Many attempts have been made to add modifiers to the phenol-formaldehyde resins in order to obtain tough, rubbery, elastic products. Some of the modifying agents such as tung oil probably enter into chemical combination while others are to a large extent, at least, merely inert additions or diluents. The number of modifiers is extremely large and some have attained commercial importance but all in some important respects have lacked desirable qualities. For example, many of the modified compositions have relatively low flow points, exhibit cold flow, tend to warp and are relatively weak. Furthermore, some of the modifiers retard the thermosetting of the phenol-aldehyde and others tend to separate from the mixture.

It is an object of this invention to provide a fusible, heat convertible resinous composition which has a relatively high flow point, but which, however, readily fluxes together on the application of heat and pressure into a homogeneous mass, and which may be quickly cured by the further application of heat and pressure or by heat alone to a relatively infusible and insoluble material capable of being removed hot from a mold.

Another important object of this invention is to provide a hard, tough, elastic resin of high tensile strength, and having improved electrical and mechanical characteristics.

Another object is to provide a cheap resin which in its final cured form is tough, relatively insoluble, infusible and inert, and which will not deteriorate in the presence of moisture, oil or any of the common organic solvents even in the presence of heat.

A further object is to provide a composition resembling vulcanized rubber in toughness and resilient, but which has much greater oil resistance.

Another object is to provide a cheap, inert composition capable of binding large proportions of fillers.

Another object is to provide an inexpensive composition suitable for golf ball covers.

Other objects will become apparent from the specification and appended claims.

I have found that the rubber hydrohalides will combine with the phenol-aldehyde resins in all proportions. These materials act toward each other like mutual solvents and give compositions of surprising strength. In combination with mutual volatile solvents they do not separate even in concentrated solutions and form films on complete evaporation of the solvent which show no signs of separation of the components. Furthermore the fusible incompletely converted phenol formaldehyde resins may be admixed homogeneously with the rubber hydrohalides by milling provided the temperature and the time of milling is not so high as to cause complete conversion, and then the homogeneous mixture molded at a temperature and time such as to cause conversion of the phenol-aldehyde into an infusible insoluble state.

The proportion of rubber hydrohalide to phenol-aldehyde resin may be varied widely. Valuable and characteristically different products may be obtained in ranges of from 2% rubber hydrohalide combined with 98% phenol aldehyde to 98% rubber hydrohalide combined with 2% phenol aldehyde. However, the preferred compositions of my invention are the tough, rubbery relatively non-thermoplastic compositions which may be removed hot from a mold.

Compositions containing as little as 40% of thermoset phenol-aldehyde resin and 60% of rubber hydrochloride can be removed hot from the mold, although 60 to 70% phenol aldehyde resin is much more satisfactory. These compositions, obtained by molding under a wide range of temperatures and time of molding as viz. 268° F. for 5 min. to 307° F. for 15 minutes are characterized by flexibility, resiliency, good surface hardness, oil resistance, acid, alkali resistance, as well as their non-thermoplasticity. It is not until the proportions of phenol-aldehyde resin goes beyond 75% that the brittleness of the product becomes pronounced but this brittleness may to some extent be retarded by increasing the time and temperature of molding with, however, some sacrifice in strength and oil resistance. However, compared with unmodified phenol-aldehyde resins these compositions are very tough. The remarkable toughening action of rubber hydrohalides on phenol-aldehyde resins is apparent even in proportion of 5% rubber hydrohalide.

I have found that all types of rubber hydrochlorides, including the partially saturated and saturated, amorphous and crystalline types, possess remarkable toughening powers on hard, brittle resins of the phenol aldehyde type. However, for superior flexibility in combination with high resistance to oils and high flow point the preferred rubber hydrochloride is a substantially saturated crystalline reaction product of hydrogen chloride and undissolved rubber reacted above the amorphous critical temperature of approximately —35° C. and preferably substantially reacted at above normal room temperatures.

All of the various phenol-aldehyde resins which are well known to this prolific art may be used in combination with rubber hydrohalides with at least some of the valuable results above indicated. Phenol-aldehyde resins made with other phenols than phenol or other aldehydes than formaldehyde are operative. Phenol ether-formaldehyde resin and phenol-furfuryl aldehyde resins are compatible with rubber hydrohalides and act similarly to the phenol-formaldehyde-rubber hydrochloride compositions. Oil modified phenol-aldehyde resins such as tung oil modified phenol-formaldehyde as well as natural resin modified phenol-aldehydes such as rosin and copal modified phenol-formaldehydes have been found of value when combined with rubber hydrohalides, particularly, however, for lacquer purposes. Furthermore, the presence of basic substances from the group consisting of basic alkali metal compounds, basic alkali earth metal compounds, basic magnesium compounds, and basic lead compounds, is of value not only for the rubber hydrochloride but also for the phenol aldehyde resins. Likewise the use of hexamethylene tetramine is of value not only as a stabilizer for the rubber hydrochloride but as a hardening agent for the phenol-aldehyde resins, and in particular for phenol-aldehyde resins containing an insufficient quantity of aldehyde.

The phenol-aldehyde resins have the advantage over many of the other resins, in that they are more compatible with rubber hydrohalides and form compositions of greater homogenity and strength. Furthermore, the incompletely converted phenolaldehyde resins may be readily and intimately mixed with rubber hydrohalides either by means of mutual solvents or by milling or other mechanical methods, and then converted to the infusible insoluble state by means of heat. The compositions are, therefore, of value not only for molded products but for lacquers and other liquid coating compositions. The effect of heat on the rubber hydrohalide-phenol aldehydes resin is also different than with the other rubber hydrohalide-heat covertible resin compositions due, probably, to the phenol group which is capable of reacting with rubber hydrochloride under certain conditions and which to some extent probably so reacts under the conditions of molding. However, whether or not any chemical reaction takes place between the rubber hydrohalides and the phenol-aldehyde condensation products the composition of rubber hydrochloride and phenol aldehyde condensation product has some very valuable and unexpected properties.

The compositions of rubber hydrohalides and phenol-aldehyde resins may be made in various ways. One method is to mill and flux the ingredients together in the presence of a basic inorganic stabilizer together with hexamethylene tetramine. The phenol-aldehyde is then converted to its insoluble state by further heat treatment. The composition may also be made by dissolving rubber hydrochloride and phenol-aldehyde resin in a mutual solvent such as benzol, toluene or the like. The solvent is evaporated and the composition baked until thermosetting takes place. It is also possible to mix the phenol-aldehyde resin in rubber and then react the mixture with hydrogen chloride. Usually the heat of reaction is sufficient to bring about conversion although this may be controlled by the use of insufficient aldehyde. Slightly different products may be made by forming the phenol-aldehyde resin in situ with the rubber hydrochloride. This may be accomplished, for example, by mixing the uncombined phenol and aldehyde (viz. resorcinol and paraformaldehyde) in rubber and reacting the mixture with hydrogen chloride in the presence of sufficient heat to cause the reaction of phenol and aldehyde. Also, an aldehyde, such as hexamethylene tetramine or paraldehyde, may be mixed with the rubber hydrochloride and the mixture reacted with a phenol. Of the various methods the milling and fluxing method has many advantages and in some ways gives a superior product.

The invention will be described in more detail in connection with the following specific examples, which are representative illustrations and are not intended to limit the invention to the specific details therein set forth:

Example I

Phenol and formaldehyde are condensed in the usual manner to a product which is capable of being hardened by heat. 40 parts of crystalline substantially saturated rubber hydrochloride and 5 parts of basic stabilizer (MgO) are fluxed on a mill and to the fluxed mixture are added 60 parts of the phenol-formaldehyde product, the milling being continued until an intimate mixture is obtained; care, however, being taken that the temperature of milling does not rise to such an extent that the phenol-aldehyde is completely converted. Fillers such as wood flour, flock, blanc fixe may be incorporated during the milling in proportions as high as 6 parts of filler per 1 part of rubber hydrochloride. The composition is then molded under 2000 lbs. pressure, at 287° F. for five minutes. The product is readily removable from the hot mold, and is a tough, flexible, resilient, strong product of good hardness and shock resistance.

Example II

A soluble, fusible, condensation product of phenol-aldehyde is formed of a type which contains insufficient aldehyde to convert it on heating to the infusible state. A mixture of 100 parts by weight of rubber hydrochloride, 10 parts magnesium oxide is milled together and to the fluxed intimate mixture is added 800 parts of the phenol-aldehyde. Hexamethylene tetramine in amount sufficient to supply the aldehyde necessary to make an infusible product is mixed into the mass, the temperature and time being kept sufficiently low so that premature conversion is not effected. The homogeneous mixture is then molded under heat and pressure condition such as to bring about conversion of the phenol-aldehyde to an infusible state. A tough, hard, relatively non-thermoplastic product is obtained, having high resistance to light and heat.

Example III

Lacquer compositions

A soluble incompletely converted phenol-aldehyde resin (viz. Phenac 633 M) is mixed with rubber hydrochloride (viz. amorphous soluble type rubber hydrochloride of 29% chlorine content) and dissolved in a mutual volatile solvent such as benzol, toluol or the like. The solution is coated on a surface, the solvent evaporated and the film baked to convert the phenol-aldehyde to the infusible state. A baking at 150° F. for two hours gives good results. The proportion of solvent, phenol-aldehyde resin and rubber hydrochloride may be varied widely. However, as in the case of the molded products, the preferred results are attained with proportions of about 60 to 70% of phenol-aldehyde resin to 40 to 30% of rubber hydrochloride. Preferably, also a basic stabilizer such as magnesium oxide, calcium oxide is present.

EXAMPLE IV

Golf ball covers

| | | |
|---|---:|---:|
| Rubber hydrochloride (amorphous 29% chlorine) | 90 | 90 |
| Magnesium oxide | 10 | 10 |
| Hexamethylene tetramine | 2 | 2 |
| Dibutyl phthalate | 10 | 20 |
| Rayox (TiO$_2$) | 20 | 20 |
| Phenol-formaldehyde resin (Bakelite XR8821) | 100 | 100 |
| Pale crepe | 20 | 20 |

The ingredients are milled together into a homogeneous mass and molded in the usual manner by cup molds into preforms, which are then molded around the golf ball to form a cover. A seven minute molding at 270° F. gives satisfactory results.

It is to be understood that the examples are largely illustrative in character and any variation or modification thereof which conforms to the spirit of the invention is intended to be included within the scope of the claims.

I claim:
1. A tough, resilient, relatively non-thermoplastic product essentially comprising a heat converted phenol-aldehyde resin within the range of about 40 to 75% by weight and a rubber hydrochloride within the range of about 60 to 25% by weight.

2. A tough, resilient, relatively non-thermoplastic product essentially comprising a heat converted phenol-aldehyde resin within the range of about 60 to 70% by weight and a rubber hydrochloride within the range of about 40 to 30% by weight.

3. A composition capable of being converted by heat to a tough, resilient, relatively nonthermoplastic product, said composition essentially comprising a heat-convertible phenol-aldehyde resin within the range of about 40 to 75% by weight and a rubber hydrochloride within the range of about 60 to 25% by weight.

4. A composition capable of being converted by heat to a tough, resilient, relatively non-thermoplastic product, said composition essentially comprising a heat-convertible phenol-aldehyde resin within the range of about 60 to 70% by weight and a rubber hydrochloride within the range of about 40 to 30% by weight.

5. A composition comprising a phenol-aldehyde resin within the range of about 40 to 75% by weight and a rubber hydrochloride within the range of about 60 to 25% by weight.

6. A composition comprising a phenol-aldehyde resin within the range of about 60 to 70% by weight and a rubber hydrochloride within the range of about 40 to 30% by weight.

HERBERT A. WINKELMANN.